Patented Sept. 21, 1926.

1,600,856

UNITED STATES PATENT OFFICE.

WINSTON F. STOODY, OF WHITTIER, CALIFORNIA, ASSIGNOR TO STOODY COMPANY, OF WHITTIER, CALIFORNIA, A CORPORATION OF CALIFORNIA.

METHOD OF AND APPARATUS FOR ELECTRIC WELDING.

No Drawing. Continuation of application Serial No. 77,388, filed December 23, 1925. This application filed August 19, 1926. Serial No. 130,339.

This invention relates to improvements in the method of and apparatus for electric welding.

This application is a continuation of my co-pending patent application Serial No. 77,388, filed December 23, 1925, and allowed August 5, 1926.

It is the object of my present invention to improve the method of and apparatus for electric welding with ferrous electrodes having a relatively low carbon content, such as those commonly referred to as iron, mild steel, or medium steel; to improve the quality of the weld; to make it easier to produce uniformly good welds; to get better penetration; to increase the rate of deposit; to lessen the consumption of electric energy required to produce a given deposit; to avoid the so-called "wild arc"; to decrease spattering; to get greater density and homogeneity of the deposited metal; to avoid pinholes; and as a result of these things to make it possible to weld more efficiently and to obtain better results and greater economy.

Most of the welding rods or welding electrodes used in electric welding are of ferrous metal of low carbon content—the so-called iron, mild steel, or medium steel welding rod. By the term "low carbon" I mean a carbon content of not more than about 0.35%. Such low-carbon welding rods are used for probably 80% or more of all electric welding operations.

Heretofore, in the use of low-carbon welding rods for direct-current electric welding, it has been found necessary, in order to produce a satisfactory weld, to make the electrical connections so that the the work is positive and the electrode negative. This is usually referred to as "straight polarity". "Straight polarity" has been considered necessary, and has been actually necessary with the low-carbon electrodes used, in order to get a satisfactory deposit of welding metal with a steady arc and good penetration. These things have made and still make direct-current electric welding impractical with the ordinary electrode of low carbon content if "reversed polarity" in used—that is, if the work is made the negative and the electrode is made the positive.

Yet it has been known that indirect-current electric welding "reversed polarity" gives better results than straight polarity with certain other types of electrodes, such as high-carbon steel electrodes, and manganese steel electrodes, and other special alloy steel electrodes, as well as when the electrode is of non-ferrous metal. Because of the requirements mentioned above, however, it has heretofore been impractical to use reversed polarity with ferrous electrodes of low carbon content—which electrodes constitute most of those used in electric welding.

I have discovered how reversed polarity may be used with ferrous electrodes of low carbon content; and how the advantages outlined above may thus be obtained with that type of electrode; and my present invention is based on that discovery.

In my investigation of the subject of direct-current electric welding, I have found that if such welding rod or electrode is substantially free from lime, or from calcium in any form, it is possible to use that electrode successfully and advantageously with reversed polarity; but that if lime, or calcium in any form, is present even in quite minute quantities, it somehow interferes with the action if reversed polarity is used, and makes straight polarity necessary for good results.

Therefore, my invention involves direct-current electric welding with reversed polarity, with a ferrous electrode of low carbon content and substantially free from lime or calcium.

This involves both the method of and the apparatus for electric welding, as will appear from the claims.

In the ordinary manufacture of ferrous welding rods, the material or stock, which itself is called "rod", is pickled in dilute sulphuric acid, is then washed with water to remove the sulphuric acid, is then coated or washed with calcium hydroxide or milk of lime and usually baked, and is then drawn to wire of suitable diameter and cut into welding rods of suitable length. The lime serves two important purposes: One is to neutralize any acid remaining on the rod; and the other is to serve as a lubricant for the rod as it passes through the wire-drawing dies. If the material is of low-carbon content, at least some of this lime remains on and in the surface of the rod throughout the whole series of drawing operations, and all other treatments to which the wire is subjected, and still persists in the final wire; although if the wire is of high carbon content or is of some alloy steel, I have found that much or all of the lime is often removed in the drawing and straightening operations. My experiments show that it is the persistent presence of this lime on the surface of the ordinary ferrous welding rod of low carbon content that has made the straight polarity necessary with that type of electrode.

The presence of this lime in or on such ferrous electrodes of low carbon content may be avoided either by removing the lime from the surface of the welding rod, or by avoiding the use of lime in the making of the welding rod.

Thus, for example: The ordinary welding rod of low carbon content, which has lime adhering to it after it is delivered from the straightening machine, can be scraped, polished, or ground to remove its outside coating or outside surface, and thus to remove such adhering and embedded lime. Or, the rod, after having been pickled in acid, washed, and treated with lime, can have the lime removed, as by washing or pickling, and then be run through the finishing dies without lime.

I have found it very effective to avoid altogether the use of lime in the manufacture of the welding rod. This may be done by making the rod or wire (from which the welding rods are cut) with the well-known liquor-bright finish; which usually involves passing the stock through or dipping it in a solution of copper sulphate or of a mixture of copper and tin sulphates, and then drawing wire from the stock. The copper, and the tin if present in the solution, plate out on the stock to some extent, and serve quite effectively as a lubricant in the subsequent drawing of the wire; and they also act to retard subsequent corrosion. I have found that this liquor-bright finish, produced on welding rod in its manufacture without the use of any lime, gives excellent results when the welding rod is used as a positive electrode.

By the use as a positive electrode of a ferrous welding rod of low carbon content and free from lime, good welding may be obtained more easily and with greater uniformity, and the weld or material built upon the work is usually found to be more dense and more homogeneous and to be substantially free from pin holes such as so frequently occur in welding with straight polarity. Further, by this use of this welding rod, any "wild arc" is practically completely avoided, so that the welding material is deposited with materially less popping and spattering. Further, it is found that the welding can be done more rapidly and more economically, because there is a greater "flow down" of the metal for a given power consumption than is the case with the ordinary welding rod used as a negative electrode, and because a given weld may thus be produced with less energy. In addition, the welding metal is deposited with better penetration than is the case with the ordinary lime-containing welding rod of low carbon content used as a negative electrode. In short, the objects set forth at the beginning are accomplished.

I am aware that in acetylene welding it is not new to use welding rods having a low carbon content and comparatively free from lime; but in acetylene welding the matters of polarity and flow of current, and of maintaining an arc, are not involved. I am also aware that in direct-current welding it is not new to use as a positive electrode a ferrous welding rod of high carbon content, or a non-ferrous electrode. However, so far as I am aware, it has never heretofore been feasible to weld effectively with a ferrous electrode of low carbon content used as a positive electrode; and by my invention such welding is not only made possible but is made distinctly advantageous over the ordinary welding with straight polarity.

I claim as my invention:—

1. The improvement in the art of direct-current electric welding, which consists in making the work the negative electrode, and using as the positive electrode a ferrous welding rod which has a low carbon content and is substantialy free from lime.

2. The improvement in the art of direct-current electric welding, which consists in making the work the negative electrode, and using as the positive electrode a ferrous welding rod which has a low carbon content and has a liquor-bright finish.

3. Direct-current electric welding apparatus, consisting of the work to which the weld is to be applied, an electrode which is of ferrous metal of low carbon content and substantially free from lime, and electrical connections whereby the work is made the negative and the electrode the positive in the welding operation.

4. Direct-current electric welding apparatus, consisting of the work to which the weld is to be applied, an electrode which is of ferrous metal of low carbon content and has a liquor-bright finish, and electrical connections whereby the work is made the negative and the electrode the positive in the welding operation.

5. A positive arc-welding ferrous electrode of low carbon content and substantially free from lime.

6. A positive arc-welding ferrous electrode of low carbon content and has a liquor-bright finish.

In witness whereof, I have hereunto set my hand at Detroit, Michigan, this 16th day of August, A. D. one thousand nine hundred and twenty six.

WINSTON F. STOODY.